March 28, 1967 E. O. GILBERT 3,311,795

ELECTRONIC INTERLOCK CIRCUIT

Filed April 22, 1964

INVENTOR.
EDWARD O. GILBERT

BY Richard L. Stephens

ATTORNEY 3,311,795

ELECTRONIC INTERLOCK CIRCUIT

Edward O. Gilbert, Ann Arbor, Mich., assignor to Applied Dynamics Inc., Ann Arbor, Mich., a corporation of Michigan Filed Apr. 22, 1964, Ser. No. 363,337
8 Claims. (Cl. 317—137)

Figures 1, 2:
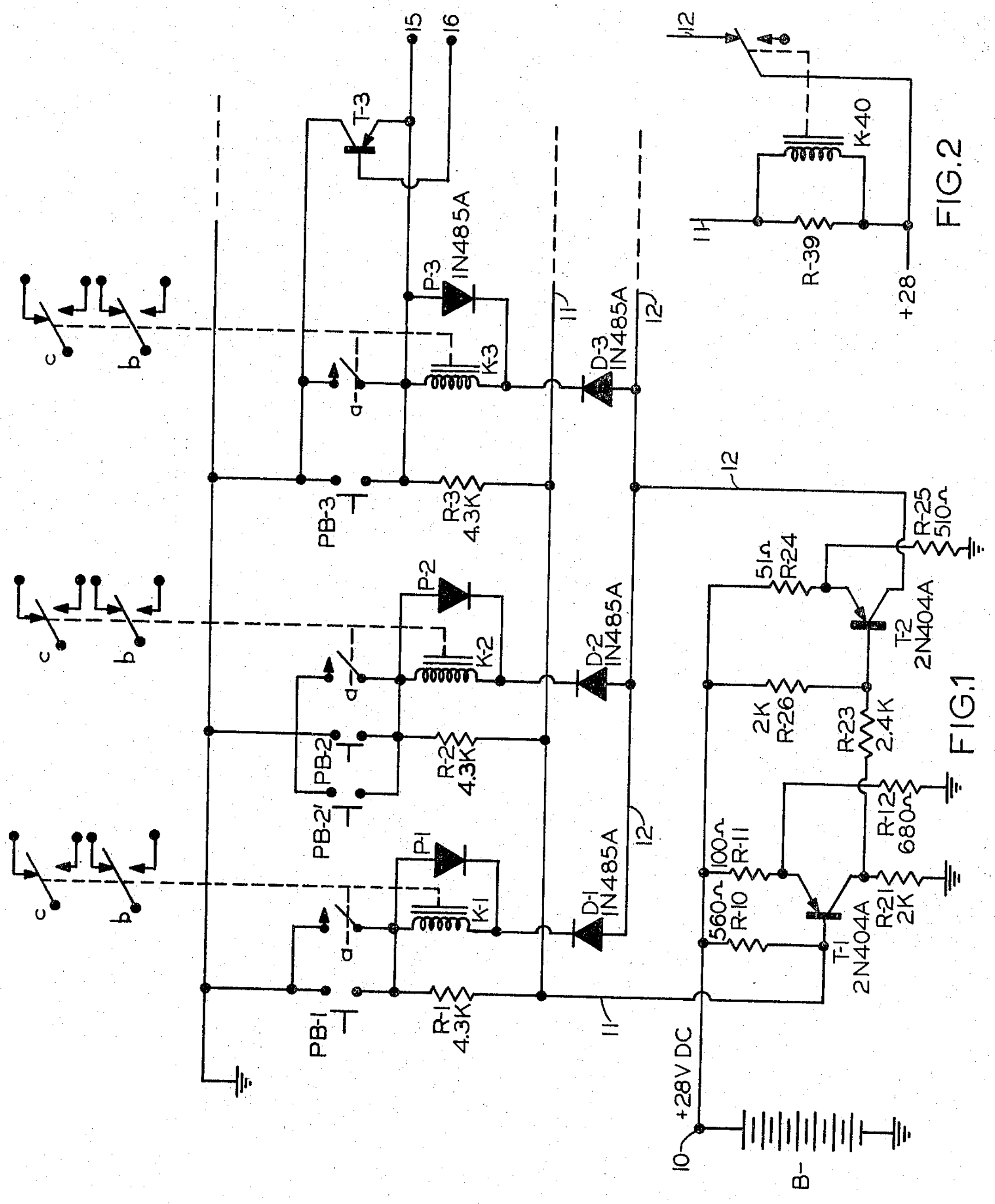

This invention relates to selective switching circuits, and more particularly, to an improved switching circuit which may be operated to energize selectively a desired one of a group of interconnected circuits. In a variety of applications in the computer and control arts, it is either necessary or desirable to close or open a selected one, or a selected group, but only one, or a selected single group, of a larger group of circuits. For example, it is often necessary to operate a selected one of a group of electromagnetic switches (relays), by momentary operation of a corresponding selected pushbutton switch of a group of pushbutton switches. Ten relays might be provided, numbered from 1 to 10, with a group of ten correspondingly numbered pushbutton switches. If pushbutton switch No. 2 is momentarily depressed, relay No. 2 should be energized. Then later, if pushbutton No. 5 is momentarily depressed, relay No. 5 should be energized. Momentary contact of pushbutton switch No. 5 should first open relay No. 2, and then close relay No. 5, and relay No. 5 then should remain closed until a differently-numbered pushbutton switch is depressed. In typical applications of this type, a plurality of contacts on the relays are provided to perform various switching functions.

In the prior art, the usual technique for providing the above described switching function has involved the use of a set of mechanically interlocked pushbutton switches. While such sets of mechanically interlocked switches have found widespread usage, they have a number of disadvantages. Unless such mechanically interlocked switches are mounted close to each other, lengthy and heavy mechanical linkages may be required. Only a limited number of pushbutton switches may be mechanically interlocked without requiring either large linkages or considerable operating forces. Furthermore, alternative remote control of such circuits by electrical signals or by a second set of pushbutton switches is usually not possible with sets of mechanically interlocked pushbutton switches. Rather than being connected to operate relays having enough contacts to provide desired switching functions, mechanically-interlocked pushbutton switches frequently are themselves provided with enough contacts to perform the desired switching functions. It frequently is impractical to provide as many contacts on a mechanically interlocked switch as may desired. Secondly, location of contacts which control different circuits closely adjacent to each other on a switch may result in undesirable interaction between the different circuits. Also, sets of mechanically-interlocked switches usually require expensive and relatively unreliable latching mechanisms, and such sets of switches usually are fixed in number and do not lend themselves to machine expansion.

The present invention overcomes all of the above mentioned disadvantages of prior art interlock circuits in a simple and economical manner. In the invention no mechanical interlock mechanisms are employed, and in fact simple and economical momentary-contact pushbutton switches may be employed. An electronic switching circuit is provided to apply power to a bus to which the coils of all of the relays to be controlled are connected. Each relay is provided with a holding or sealing circuit connected in parallel with a respective pushbutton switch. A current-measuring circuit connected to the holding circuit-pushbutton switch parallel circuits of all of the relays determines how many such parallel circuits are closed and provides a control signal. If no relays are closed, or if one relay is closed, the control signal maintains the electronic switching circuit so as to apply operating power to the bus. When an additional pushbutton switch is depressed to operate a different relay, the current-measuring circuit senses that two of the parallel paths are closed, providing a control signal which removes power from the bus, dropping out any theretofore closed relays. As soon as a previously-closed relay drops out, the number of relay closure parallel paths is reduced to one, decreasing the current in the current-measuring circuit so that power is again applied to the bus and the newly-selected relay is energized. Because operation of any relay requires that all other relays be dropped out, "break before make" operation is obtained, and it is impossible for two relays to be closed simultaneously.

It is a primary object of the present invention to provide an improved interlocked selective switching system.

It is a further object of the present invention to provide an electronic interlocked switching system in which "break before make" operation is obtained, and in which it is impossible for two utilization circuits being switched to be closed simultaneously.

It is another important object of the invention to provide an interlocked switching circuit in which any desired number of utilization circuits may be selectively switched and in which interlocking and "break before make" operation is in no way dependent upon the adjustment or selection of any circuit time-constant nor dependent upon relay "pull-in" or "drop-out" times, nor on any critical relay "pull-in" or "drop-out" voltages.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

FIG. 1 is an electrical schematic diagram of an exemplary embodiment of the invention; and FIG. 2 is a schematic diagram of an alternative portion of the invention.

In the circuit shown schematically in FIG. 1, relays K–1, K–2 and K–3 are intended to be controlled individually by momentary contact pushbutton switches PB–1, PB–2 and PB–3, respectively. As indicated by dashed lines in FIG. 1, any desired number of additional pushbuttons and relays may be added, and each additional pushbutton switch and its associated relay may be connected in the same manner as those shown in FIG. 1.

It is a feature of the invention that additional pushbutton switches and relays may be added at will, substantially without limit, without any requirement that any portions of the circuit shown be re-adjusted or changed to accommodate further pushbuttons and relays. In the circuit shown, exemplary component values are shown solely to facilitate understanding of the invention, and in the ensuing description approximate typical operating voltages are assumed for the same purpose.

In FIG. 1 electrical power will be seen to be applied at terminal 10 from a +28 volt power supply, such as battery B, and all current is shown returned to the power supply B through a ground connection. Before power is turned on, all three of the relay coils (K–1, K–2, K–3) shown will be seen to be de-energized, and when power is first turned on, all three relay coils will remain de-energized until one or another of the pushbutton switches is operated. In a number of prior art mechanically interlocked arrangements, that circuit which was energized when the power was last turned off becomes immediately energized when the power is again turned on. Because the last switching condition from a prior operation of a machine before the machine is turned off seldom bears any desired relation to the first switching function desired when the machine is later turned on, it is usually desirable that the switching circuit not automatically energize the last previously-energized circuit, and hence the fact that no relay is operated automatically in the present invention merely by turning on machine power is a further advantage of the present invention over prior art mechanical interlock systems.

When the 28 volt power is turned on, before any pushbuttons are depressed, none of the three relays drawn will be energized, for the reason that diodes D–1, D–2 and D–3, which are in series with respective relay coils of relays K–1, K–2 and K–3, all will be reverse-biased. Diodes D–1 to D–3 will be reverse-biased because conductor 11 will lie at +28 volts and conductor 12 will lie relatively negative, at approximately +24 volts. With no current flow through R–1, R–2 or R–3, there will be no voltage drop across resistor R–10, which connects conductor 11 to the +28 volt power supply terminal 10, and hence conductor 11 will lie at the supply voltage of +28 volts. Resistors R–24 and R–25 form a voltage divider which holds the T–2 transistor emitter at approximately +24 volts. Transistor T–2 is biased on, as will be explained, so that transistor T–2 is effectively shorted, thereby establishing the T–2 collector voltage (and conductor 12) at approximately +24 volts. With conductor 11 at +28 volts, and with conductor 12 at +24 volts, as explained above, diodes D–1, D–2 and D–3 all will be reverse-biased, so that no current will flow through any of the relay coils, and none of the relays will be energized.

Under the conditions assumed above, with power turned on, but with none of the pushbuttons having yet been depressed, transistor T–1 is held at cutoff, which results in transistor T–2 being conducting. As mentioned above, the base of T–1 is held at +28 volts (because no current is flowing through resistors R–10 and R–1); and the voltage divider consisting of resistors R–11 and R–12 holds the emitter of T–1 at +24 volts, so that the T–1 base is four volts positive with respect to the T–1 emitter, and transistor T–1 is cut off. With transistor T–1 cut off, the base of transistor T–2 is held negative with respect to the T–2 emitter by R–21 and R–23, thereby turning transistor T–2 on. And with transistor T–2 on, the +24 volt emitter voltage of T–2 is applied to conductor 12, as mentioned above, thereby back-biasing diodes D–1, D–2 and D–3.

Now assume that pushbutton switch PB–1 is momentarily operated. Closure of switch PB–1 will be seen to close the circuit between conductor 12 and ground, so that current flows through diode D–1, the operating coil of relay K–1, and pushbutton switch PB–1 to ground.

Energization of relay coil K–1 closes holding or sealing contact *a* of relay K–1, thereby maintaining relay K–1 energized after momentary-contact pushbutton switch PB–1 is released. Inasmuch as the K–2 and K–3 circuits are identical to the K–1 circuit, it will be apparent that either relay K–2 or relay K–3 could have been engaged instead of relay K–1 by momentary closure of pushbutton switch PB–2 or PB–3 instead of momentary closure of pushbutton switch PB–1. It is important to note that closure of switch PB–1 and energization of relay K–1 do not alter the states of transistors T–1 and T–2. When switch PB–1 is closed, resistors R–10 and R–1 form a voltage divider, so that the voltage on conductor 11 becomes less than +28 volts, but still above the +24 volts existing at the T–1 emitter, so that the T–1 base remains positive with respect to the T–1 emitter, and T–1 remains cut off, and because T–1 remains cut off, transistor T–2 remains conducting.

Now assume that pushbutton switch PB–3 is momentarily closed. Conductor 11 will now be connected to ground through resistor R–3 as well as resistor R–1, thereby pulling the voltage on conductor 11 (and the base of T–1) further toward ground, thereby making the T–1 base negative with respect to the T–1 emitter and turning transistor T–1 on. Thus the values of upper resistors R–1, R–2, R–3 etc. are selected with respect to the value of R–10 so that current flow through only one of the upper resistors provides insufficient voltage drop across R–10 to turn on T–1, but so that current flow through any two of the upper resistors will cause a voltage drop sufficient to turn on T–1. Thus the circuit shown automatically senses how many of the upper resistors are carrying current by measuring the voltage-drop across resistor R–10.

Turning transistor T–1 on provides a control signal from the T–1 collector via resistor R–23 to the base of transistor T–2, turning transistor T–2 off, thereby causing bus 12 to swing to zero volts (ground). With bus 12 at zero volts relay K–1 will open, after the relay drop-out period (several milliseconds with typical relays). The de-energization of relay K–1 opens holding contact *a* of relay K–1, thereby cutting off current flow through R–1 to ground, so that the voltage on conductor 11 and the T–1 base is now governed by the voltage divider consisting of resistors R–10 and R–3. Because the T–1 base now is positive again with respect to the T–1 emitter, T–1 is turned off again, turning T–2 on, and again applying +24 volts via the collector of transistor T–2 to conductor 12. Current now will flow from conductor 12 via diode D–3, the coil of relay K–3 and pushbutton switch PB–3 to ground. After the relay pull-in time, holding contact *a* of relay K–3 will be closed, and relay K–3 will remain operated even after pushbutton switch PB–3 is released. The above-described process will result when any pushbutton switch is operated, momentarily turning off T–2 to drop out the previously closed relay and then immediately thereafter turning T–2 on again to energize the newly-selected relay. Each of the relays is shown provided with *b* and *c* contact arms to provide desired switching functions in external circuits (not shown). Diodes P–1, P–2 and P–3 connected across the relay coils are provided to prevent damage to the transistors from the inductive kick voltages which develop from collapse of flux in the relay coils when they are opened, and it will be recognized that such protective diodes may be omitted in many embodiments of the invention. As well as further switch contacts, it will be apparent to those skilled in the art that the relays may be connected to operate flags, linkages, and other devices. Diodes D–1, D–2, D–3 etc. operate to isolate the individual relay circuits from each other, so that the current flowing through a given one of the resistances R–1, R–2, R–3 etc. results solely from closure of the associated pushbutton switch and/or holding contact. If these diodes were omitted, and if relay coil resistance were low compared to the resistance of resistor R–1, or R–2, etc., it will be seen that resistors R–1, R–2 and R–3 would essentially be connected in parallel.

Reverting now to the above described operation wherein relay K-1 was initially energized and then relay K–3 was next operated, it is important to note that when switch PB–3 was depressed the states of transistors T–1 and T–2 were switched, and thus relay K–1 was de-energized, at a time prior to when the coil of relay K–3 could be energized, insuring the "break before make" operation important in very many switching applications. Another important advantage of the invention is that no circuit time-constants needs be selected in order to match the pull-in or drop-out times of any of the relays, and if desired, the various relays used in the invention may have widely varying operating times, and their operating voltage levels need not be matched. As heretofore mentioned, as many additional relays and pushbutton switches may be added as desired, without limit, and without existing relay circuits requiring re-adjustment when additional relays are added.

It will be seen that the relays may be located remotely from the pushbutton switches, with the pushbutton switches located either together or widely separated as desired. Also, any relay may be connected to be operated from as many different locations as desired, merely by connecting additional pushbutton switches in parallel. In the figure, pushbutton switch PB–2 is shown connected in parallel with pushbutton switch PB–2 to typify such operation, and it will be apparent that as many further pushbutton switches as desired may be connected in parallel with any of those shown in the figure. Furthermore, any relay may be connected so as to be capable of automatic operation as well as manual operation, by provision of an electronic switch in parallel with the pushbutton switch. Such operation is exemplified in the figure by transistor T–3 connected in parallel with pushbutton switch PB–3. Application of an electronic signal between terminals 15 and 16 will turn on transistor T–3 and short across switch PB–3. Such alternative operation is obviously impractical in most if not all mechanical interlock systems of the prior art.

It will be apparent to those skilled in the art as a result of this disclosure that relay switches K–1, K–2, K–3 etc. may comprise motor-driven switches, if desired.

FIG. 2 schematically illustrates a modified interlock arrangement which is suitable for less critical applications. The apparatus of FIG. 2 may be substituted for the T–1 and T–2 apparatus of FIG. 1, with connections to lines 11, 12 and to the +28 volt supply as shown. In FIG. 2 the current flowing through line 11 develops a voltage across resistor R–39. Resistor R–39 is chosen so that the current through resistor R–1 alone, or R–2, or R–3 alone (or any relay operating alone) provides insufficient voltage to operate relay K–40, but so that a current through R–39 commensurate with two relays (of the group K–1, K–2, K–3 etc.) is closed, sufficient current is applied through R–39 to provide "closing" voltage to the coil of relay K–40. Operation of relay K–40 will be seen in FIG. 2 to transfer its contact, thereby de-energizing conductor 12 in much the same manner that cut-off of transistor T–2 resulted in line 12 being de-energized.

The circuit of FIG. 2 operates substantially equivalently to that of FIG. 1 if relay K–40 is provided with a faster (lesser) pull-in time than any of relays K–1, K–2, K–3 etc. In fact, in those applications in which simultaneous closure of two relays of the K–1, K–2 etc. group is not deleterious, relay K–40 need not be faster than K–1, K–2 and K–3.

However, the circuit of FIG. 2 is somewhat critical as respects relay "pull-in" and "drop-out" voltage levels. If closure of a second circuit closes K–40, but after the opening of the previously-closed circuit, the current through the holding contact of the second circuit well might exceed the "drop-out" current of relay K–40, thereby requiring release and re-activation of the second push-button, i.e. essentially double operation of the second push-button, in order to close the second circuit.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described my invention, what I claim as new and desire to secure by Letters Patent is:

1. A relay interlock circuit, comprising, in combination: a plurality of selectively operable switches; a plurality of electromagnetic relays each including an operating coil and a holding circuit, each of said holding circuits being connected in parallel with a respective one of said switches; a first plurality of resistances; a first terminal and a second terminal, each of said switches being connected in series with a respective one of said resistances between said first and second terminals; a second resistance connected in series with said second terminal; voltage supply means connected between said second resistance and said first terminal; a plurality of uni-directional conduction devices, each of said operating coils being connected in series with a respective one of said devices, in series with a respective one of said switches, and to a third terminal; means for sensing the amount of current flowing through said second resistance and for providing a control signal; and electronic switching means for switchably applying power to said third terminal, said control signal being connected to control said electronic switching means.

2. A relay interlock circuit, comprising, in combination: a plurality of electromagnetic relays each including an operating coil and a normally-open holding contact connected in series with said operating coil; a plurality of diodes; first and second terminals, each of said relays being connected in series with a respective one of said diodes between said first and second terminals; power supply means and switching means responsive to a control signal; said power supply means being connected to apply power between said first terminal and said switching means being operable to apply power to said second terminal; a plurality of selectively operable switches, each of said switches being connected in parallel with a respective one of said holding contacts; a plurality of resistances, each of said resistances being connected in series with a respective one of said switches and a respective one of said holding contacts; a further resistance connected to each of said resistances of said plurality and to said power supply means; and means for sensing the current flowing through said further resistance and for providing said control signal.

3. A circuit according to claim 2 in which said means for sensing the current flowing through said further resistance includes a transistor circuit connected to be switched on and off in accordance with the voltage drop across said further resistance.

4. A circuit according to claim 2 in which said means for sensing comprises a further relay connected to be operated by the voltage drop across said further resistance.

5. A circuit according to claim 2 having at least one further selectively operable switch connected in parallel with one of said selectively operable switches of said plurality.

6. A circuit according to claim 2 having at least one further semi-conductor switching device connected in parallel with one of said selectively operable switches of said plurality.

7. A circuit according to claim 2 in which said means for sensing includes a transistor connected to be controlled in accordance with the voltage drop across said further resistance, to be switched on when current through said further resistance exceeds a selected value and to be switched off when said current is less than said selected value.

8. A circuit according to claim 7 in which said switching means comprises a semiconductor switching device connected to be controlled by said transistor, to apply power to said second terminal when said current through said further resistance is less than said selected value.

References Cited by the Examiner

UNITED STATES PATENTS

| | | | |
|---|---|---|---|
| 2,315,958 | 4/1943 | Hill et al. | 317—137 X |
| 2,869,110 | 1/1959 | Wagner | 317—137 X |
| 2,971,135 | 2/1961 | Ebert | 317—137 |
| 3,160,793 | 12/1964 | Colburn et al. | 317—137 |

MILTON O. HIRSHFIELD, *Primary Examiner.*

L. T. HIX, *Assistant Examiner.*